(12) United States Patent
Natta

(10) Patent No.: US 8,389,899 B2
(45) Date of Patent: Mar. 5, 2013

(54) CONNECTOR FOR CONNECTING WELDING TORCH

(76) Inventor: Antal Natta, Diósd (HU)

( * ) Notice: Subject to any disclaimer, the term of this patent is extended or adjusted under 35 U.S.C. 154(b) by 670 days.

(21) Appl. No.: 12/294,234

(22) PCT Filed: Sep. 12, 2006

(86) PCT No.: PCT/HU2006/000074
§ 371 (c)(1), (2), (4) Date: Jan. 5, 2010

(87) PCT Pub. No.: WO2007/031806
PCT Pub. Date: Mar. 22, 2007

(65) Prior Publication Data
US 2010/0108656 A1 May 6, 2010

(30) Foreign Application Priority Data

Sep. 12, 2005 (WO) ................ PCT/HU2005/000100

(51) Int. Cl.
*B23K 9/00* (2006.01)
*B23K 9/09* (2006.01)
*B23K 9/28* (2006.01)
*B23K 9/32* (2006.01)

(52) U.S. Cl. ............... 219/136; 219/137 PS; 219/137.2; 219/137.51; 219/137.63; 219/137.9; 219/139

(58) Field of Classification Search ............... 219/136, 219/137 PS, 137.2, 137.51, 137.63, 137.9, 219/139
See application file for complete search history.

(56) References Cited

U.S. PATENT DOCUMENTS

| | | | |
|---|---|---|---|
| 4,600,824 A * | 7/1986 | Moerke | 219/137.63 |
| 4,687,899 A * | 8/1987 | Acheson | 219/137.9 |
| 4,873,419 A * | 10/1989 | Acheson | 219/137.9 |
| 4,942,281 A * | 7/1990 | Srba | 219/136 |
| 5,378,870 A * | 1/1995 | Krupnicki | 219/137.63 |
| 5,403,987 A * | 4/1995 | Rehrig | 219/137.51 |
| 6,786,752 B1 * | 9/2004 | Kerekes et al. | 219/137.63 |
| 7,241,972 B2 * | 7/2007 | Kensrue | 219/137.2 |
| 7,274,001 B1 * | 9/2007 | Cusick, III | 219/137.9 |

FOREIGN PATENT DOCUMENTS

| | | |
|---|---|---|
| CH | 670210 A5 | 5/1989 |
| EP | 0074430 A | 3/1983 |
| FR | 2556634 A1 | 6/1985 |
| WO | 01/00364 A | 1/2001 |

OTHER PUBLICATIONS

International Search Report from International Appln No. PCT/HU2006/000074, mailed on Jun. 2, 2007.

* cited by examiner

*Primary Examiner* — Trong Phan
(74) *Attorney, Agent, or Firm* — Kolisch Hartwell, P.C.

(57) ABSTRACT

A connector for connecting a welding torch, where the connector body and the house are made of insulating material and designed as a unit in one piece connected by a rear wall. The connector includes an insert made of electrically conductive material carrying a threaded surface made of electrically conductive material and a contact surface. The insert can be fitted in a nest formed by a side surface of the connector body part and a surface of the house part opposite to the side surface. An opening on the sidewall of the house part provides access to the side surface of the insert for connecting the side surface to a current, and the insert is secured rotationally in the nest.

8 Claims, 3 Drawing Sheets

CONNECTOR FOR CONNECTING WELDING TORCH

The invention relates to a connector for connecting on an arc welding torch, more precisely to the socket-like connecting part in an arc welding apparatus, operating with consumable electrodes and with protective inert gas, that connects the apparatus to the welding torch, and which is quite commonly described as the "central connector" in technical terminology, and which is usually fixed onto the front panel of the welding apparatus as a socket, into which the plug-like connector part located at the end of the cable of the welding torch can be fixed by plugging it in and by threaded pipe fixing.

According to this invention, the connector has a cylindrical front part, its connector body is made of electric insulating material, mostly of plastic, and has a nest on the front surface for the wire conduit connector, and has another nest for the gas pipe stub connector, and has one or more electrical connections sunk into the front surface. The connector also has an pipe inserted for the wire conduit located in the bottom of the hole for the wire conduit connector, as well as another hole leading into the hole for the gas pipe stub connector and which incorporates a gas supply pipe stub fixed to the outside of the hole. The connector also has a cylindrical body which is made of a material which is a good electrical conductor, such as brass or of some other, appropriate brass alloy, and is situated on the front, cylindrical part of the connector. The electrically conductive body has on its outside a threaded surface besides its side contact surface. The electrically conductive body has a front contact surface, which is mostly ring shaped. On the side contact surface of the electrically conductive body there is a threaded bore, and a screw which fits into it. The connector also has a attachment bracket made of electrically insulating materials, mostly plastic, and this attachment bracket comprises a sleeve that encircles the threaded part of the electrically conductive body, and which has a flange, on the front part of sleeve with one or more holes bored to fix the connector. The attachment bracket, the electrically conductive body and the connector body are all in a fixed position relative to each other.

A connector registered under patent Reg. No EP 0 794 029 A1 is known, on which the threaded surface for fixing the connecting part with a pipe connection and the ring-shaped contact surface for delivering welding current are on the side and the front part of a practically cylindrical shaped contacting body. The contacting body is made of brass or other electrically conductive material. To deliver the welding gas to the contacting body, a stem made of a good electrically conductive material is used, which is either fixed as a separated unit in a bore from the back in the front part of the hole that incorporates the wire conduit connector, or is made into a projection from the back of the contacting body. The inserted pipe for connecting the electrode wire into the connector is situated in a bore drilled in the middle of the stem, and the welding gas is also led into the contacting body through this stem, on its back, e.g by fixing the current cable lug on the stem with a threaded fixing.

A sleeve with a flange is used for fixing the connector in the front panel of the welding apparatus. The bores for fixing are drilled in the flange. The contacting body is fitted into the narrower part of the sleeve with a screw.

Owing to the good electric conductive values of the metal that the whole contacting body and the stem are made of, performance losses are low, so even under hard usage they do not warm up at all, or just to a negligible extent, but there is a disadvantage as well, because the relatively big quantity of metal has a significant weight. As a result of its structural design, the connector's dimension lengthways is relatively long, and requires quite a lot of room to fit and fix, and the establishment of the necessary connections needs to be considered well in advance.

Another connector is described under the patent Reg. No. EP 1.120.202.202, which has a cylindrical connector body part, and a housing which encircles and fixes the connector body from sideways, and these two parts are connected into a single unit at their backs with a flat, plastic sheet, a material which has good electric insulating qualities. Holes providing places for connecting the relevant elements from the other connector part are established in the front surface of the cylindrical connector body, the electric contacts are sunk, and the holes leading to the contacts and the holes are established both inside the connector body part and on its rear surface.

The connector also has a current transferring insert with a sleeve shape made of good electrically conductive material, which fits on the cylindrical connector body part, in a hole, which is formed by the mantle surface of the connector body part and by the surface of the housing opposite the mantle surface. On the front surface of the insert is a contact surface and is established as a contact with the other connector part. On the mantle of the insert a threaded surface is made necessary for fixing together the connector parts, and next to the threaded surface side contact surface is made for leading the welding gas. In the side walls of the housing there is a hole which leaves the side contact surface of the insert uncovered, and through which the welding current conduit can be directly connected to the current transferring insert with a threaded fitting. The insert is prevented from turning inside the hole either by the insert's shape and/or by blocking the equipment fixed to the side contacting surface by the rim of a hole that is on the side wall of the housing part by letting it make contact.

Although this connector, owing to its structural design, is lighter in weight and requires less space than the one first discussed, there are also disadvantages, one of them is that practically all the surfaces of its current transferring insert are covered by the wall separating the hole, so, apart from the side contacting surface, there is no surface of the connector outside and in contact with the open air, as a result of which it warms up when it is used without interruption under hard usage.

Another disadvantage is that it can be fixed only in one position to the front panel of the equipment, and this is the only position in which it can be worked, which is not necessarily the best position from the point of view of working with it.

There is a further disadvantage, when the connector is put together with a wire puller so that the two parts would make one unit, in which the two parts are fixed together, then the two parts can only be worked on separately by using separated working materials in two different work phases. The above mentioned disadvantages motivated us to look for a connector which preserves and unites the advantages of the connector solutions we discussed, but without their disadvantages, and is light weight, and its current supply is provided from the side, so its dimensions would not be bigger than that of the connector we describe later, and also can be fixed in a position for working that is optimal from the point, of view of working, so that any kind of work on it would be easier and simpler. In addition to all these, the new connector's load and insulation characteristics are at least as good as the ones we discussed above, furthermore it is designed according to standards, so it can be replaced by and is compatible with the existing models.

The invention is based on understanding that to fulfill the criteria of an ideal connector, in which the attachment bracket functioning as a housing and the connector body are located together with a dismantleable fixing, and in which the connector body and the current transferring body are also fixed with a detachable fixing, and is designed in a way so that the current transferring body has various cooling surfaces so it will only warm up to a smaller extent, and the connector is also designed in a way so that it can be directly positioned and fixed with an appropriate wire puller.

According to this invention, the connector for connecting welding torch comprises a connector body with a cylindrical front part made of electrically insulating material, mostly of plastic, a nest for wire guide conduit end, a nest for gas supply conduit end situated on the front surface of the connector body, and one or more electric contacts let into hole(s) situated on the front surface, and a liner for wire guide, leading into the bottom of the nest for wire guide conduit end, a passage which leads into the nest for gas supply conduit end and a gas lead-in pipe stub fixed into the outer end of the passage, further and a cylindrical current transferring body fitted on the cylindrical front part of the connector body, made of electrically conductive material, a threaded surface and a side contact surface besides the threaded surface on the side surface of the current transferring body, and a frontal contact surface, mostly ring-shaped frontal contact surface on the current transferring body, a threaded bore on the side contact surface of the current transferring body for screwed joint and a joining element to join into the threaded bore, in addition an attachment bracket, made of electrically insulating plastic, the attachment bracket has a sleeve part, which encircles space apart the threaded surface of the current transferring body, the sleeve part has a flange protruding from its front part for fixing, the flange is provided with one or more holes in it, and the attachment bracket, the current transferring body and the connector body are in a fixed position relative to each other. The essential character of the connector, that the connector body has a rear limiting surface out of which a stem projects, the stem has a bore hole in its centre line into which the liner for wire guide is fixed, the current transferring body has pot-shape, having a bottom in which there are openings opening onto the nest for wire guide conduit end, onto the nest for gas supply conduit end and onto the electric contact(s), further the side contact surface projects at the threaded surface and the threaded bore on the side contact surface is drilled through, and there is a positioning hole in the extension of the threaded bore on the side of the connector body, further the attachment bracket has a conically narrowed part projecting rearwards from the sleeve part, and on the inner surface near the end of the narrowed part there is at least one screw thread which joins to the side threaded surface of the current transferring body, and there is at least one cut in the end provided with the screw thread of the narrowed part, and there is an uncovered side surface besides the threaded surface on the current transferring body.

In the preferred embodiment of the connector according to the invention, there is an insulating sleeve which encircles the electric contact let into hole(s) situated on the front surface of connector body, and the end of the insulating sleeve projects into the opening which is situated in the bottom of the current transferring body.

The insulating sleeves ensure separation of the contacts from both the bottom of the current transferring body both the connector body, additionally they prevent connection with the other connector member which if not properly connected, would cause unwanted contact to occur. The parts of the insulating sleeves that stick out from the front surface also position the current transferring body on the connector body.

In another preferred embodiment of the connector, the part of the current transferring body carrying the threaded bore drilled through in the side contact surface is formed as a thicker projection.

In this preferred embodiment there is a positioning indent on the side surface of the connector body to receive and to fit the projection of the current transferring body.

In an improved construction of the connector a front shoulder is situated on the side surface of the connector body for positioning the current transferring body.

In another preferred embodiment of the connector there is an indent on the side of the stem which projects from the rear surface of the connector body. This solution, in case of building together with an appropriate wire puller, makes fixing the joined position easier.

Another preferred embodiment is also beneficial, in which the wire(s) connecting to the electric contacts is/are led in from the side of the connector body. This solution makes putting the connector into the welding apparatus easier, and additionally it makes the assembly with a wire puller easier.

Another preferred embodiment is in which the gas supply conduit stub leading in projects out from the connector body side surface. This solution also makes joining the connector to the welding apparatus easier, as well as making it to easier assemble with a wire puller.

According to the invention, the inserted wire conduit fixed in the stub's axis bore can be replaced if needed. The inserted pipe is made of a wear-resistant material, both electrically conductive materials or insulating materials can be used.

The current transferring body is made of a material which has good electric conductive qualities, preferably from brass or from other, appropriate alloys, shaped either by cutting or by alternative cold working.

The connector body and the attachment bracket are made of an electrically insulating material, mostly of plastic, preferably from polyamide or something similar, with the appropriate hot-working procedure.

The current transferring body is situated on the cylindrical front part of the connector body. Preventing the current transferring body either turning around or turning at the axis from its position on the connector body is ensured by a fixing screw which fixes the current lead-in in the positioning indent on the side of the connector body. Turning to one direction at the axis is stopped by the bottom plate of the current transferring body which hits the front surface of the connector body.

In certain preferred embodiments turning of the current transferring body on the connector body is blocked by the insulating sleeve ends, which project out from the connector body's front surface, and which fit into the appropriate holes on the bottom plate of the current transferring body, or it can be blocked by fitting the current transferring body's projection into its positioning indent.

In other embodiments turning of the current transferring body on the connector body at the axis is stopped in one direction by the front shoulder of the connector body, into which the current transferring body is put in its proper position, as well as being blocked by fitting the current transferring body's projection into its positioning indent. The most significant advantage of the connector is that it can be fixed in a position which is optimal from the point of view of working with it. If properly used, the connectors attachment bracket is pushed from the front through the hole which is on the front panel of the welding apparatus and is screwed onto the threaded surface which is behind the front panel on the current transferring body which is fixed on the connector body, and the threaded surface is turned to the optimum position from the point of view of connecting the contacts. To fix the attachment bracket it has to be screwed to the end of the thread, to a position where it jams, and in which the fixing bores line up with the bores, on the front panel of machine. While screwing it up, the thread on the current transferring body might force open the thread which is on the narrowed part of the attachment bracket, but cannot damage it, because the cuts on it and the small flexibility of the attachment bracket's material let the narrowed part expand a little bit, e.g. the thread section between a cut might jump out from the thread on the current transferring body, but the stay-in thread sections, owing to their flexibility, will fix properly the current transferring body to the attachment bracket body, while the attachment bracket is fixed with a screw fixing onto the front panel.

Another advantage of the connector besides its light weight, and small space requirement, is that by providing an uncovered surface on its side and by the bottom plate of the current transferring body, it improves the cooling qualities of the connector up to a point that it does not warm up even under continuous hard usage. It is also an advantage that, as a result of its structural solution, it can be put together with a single wire puller, without using any extra assembling materials, which provides a very wide range usability.

In the following we will show details of a preferred embodiment of the connector according the invention to the schematic drawings attached in which:

FIG. 1 shows the exploded perspective view of the connector (10) with the embodiment of the invention. The main parts of the connector (10) in the diagram are the connector body (12), the current transferring body (30), the fixing screw (50) and the attachment bracket (60).

Figure 1:
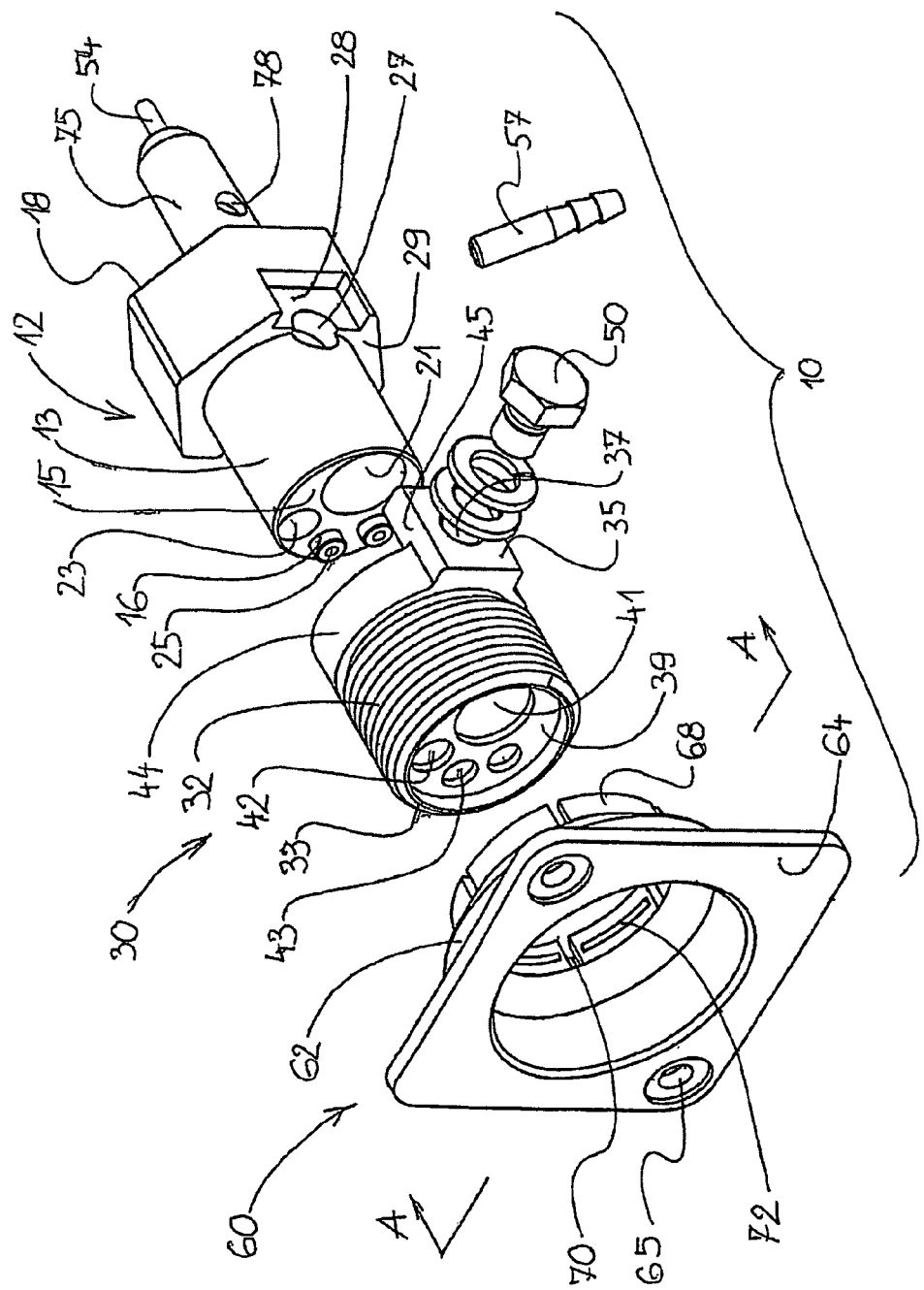
FIG. 1 is an exploded front perspective view of the proposed connector

The connector body (12) has a cylindrical front part (13), at the end of the front part (13) there is a front shoulder (29), a thicker middle part with a positioning indent (28) on its side surface, and a rear surface (18) as a stop, and from the rear surface (18) a stem (75) projects backwards.

On the front surface (15) of the connector body (12) holes are formed for connecting the appropriate parts of the other connector part, namely the hole for the wire guide contact (21), and another hole for the gas pipe stub (23). There are also two indents on the front surface (15) with an electric contact let into each (only one of them (25) is listed with a separate number on the diagram). There is an insulating sleeve (16) in the hole (25) to separate the contacts from the bore's wall, and as it can be better seen on FIG. 2, the end of the insulating sleeve (16) encloses the electric contact, and protrudes from the front surface (15) of the connector body.

In the centre level of the stem (75), as it will be explained in detail when discussing FIG. 2, there is a bore, which leads into the bottom of the hole (21) for the wire guide contact, and into the bore an inserted pipe (54) for the wire guide is fixed, and there is a hole (78) on the stem (75).

In the connector body (12) there is another hole, (23) for the gas pipe supply stub, and to the outside part of this hole (it cannot be seen on the diagram) the gas pipe supply stub (57) itself is fixed with an appropriate washer. The pipe stub (57) is to lead the protective inert gas to the connector (10), and to deliver it to the welding torch through the gas delivering pipe stub, which, equipped with the appropriate washer, is fitted into the other connector body's hole (23).

The connector body (12) is made of electrically insulating plastic, preferably of polyimide, and is shaped by hot-working procedure in one piece.

The connector (10) has a cup-shaped current transferring body (30), which acts as a contact for the welding current. The current transferring body (30) has a threaded surface (32) on its outer side, and there is a side (35) contact surface next to the threaded surface (32). On the contact surface there is a threaded bore (37) drilled through, which is at right angles to the central level of the current transferring body (30). There is an uncovered side surface (44) adjacent to the contact surface (35), and there is a ring-shaped front contact surface (33) in front of the threaded surface (32), and it has a bottom plate (39). The threaded surface (32) is to connect to the other connector part with a threaded pipe fitting, and the welding gas is transferred through a ring-shaped front (33) contact surface to the appropriate contact of the other connector part. The current transferring body (30) on its side (35) contact surface has a thicker (45) projection with a threaded bore (37) drilled into in, and the bore (37) has a screw (50), which fits in.

The current transferring body (30) is caught by the positioning hole (28), which is situated on the side of the cylindrical (13) front of the connector body (12), and the flange is caught by the front shoulder (29) of the connector body, thus the current (30) transferring body is completely prevented from turning around, and partially from turning at the axis.

There are access openings (41,42,43) leading to the wire guide contact nest (21), smaller holes for the electric contacts (25) and another lesser hole for the gas transferring pipe stub (23), which are situated in the bottom plate (39) of the current transferring body (30). The bottom plate (39) of the current transferring body (30) fits to the front surface of the connector body (12), and the insulating sleeves (16), encircling the electric contacts, extend out of the holes (43) situated in the bottom plate (39), which, on one hand, prevents the current transferring body (30) turning around, and on the other hand also prevents an undesirable contact occurring when it is connected to the other connector part.

The screw (50) is to fix the side welding current contact, e.g. it is positive but dismantleable which fixes the current cable lug (not illustrated on the current cable drawing) to the side (35) contact surface. The screw (50) also fixes the current transferring body (30) in position onto the connector body (12) by making it fit into the indent (27) and an extension of the bore (37), e.g. a blind bore.

The current transferring body (30) is made of brass or of another good electrically conductive material, preferably of a brass alloy.

The connector (10) also has a bracket attachment (60) made of electrically insulating plastic, in this particular example polyamide. The bracket attachment (60) has a sleeve part (62), which encircles and covers the (32) threaded surface of the current transferring body, but also leaves a gap, to allow enough space for making the necessary threaded pipe fixing. The sleeve (62) of the attachment bracket (60) has a flange (64) projecting out its front for fixing, and in this flange (64) there are various fixing bored holes, in this particular example two. Only one of them is listed under a separated number (65). There is a conically (68) narrowed extension backwards of the sleeve (62) of the bracket attachment (60). In the inside surface of the narrowed (68) extension, on its end, there is one screw thread (72), which is connected to the threaded surface (32) situated on the side of the current (30) transferring body. In the part where the screw thread (72) is located there are several cuts (70). The bracket attachment (60) is fixed onto the current transferring body (30) by screwing and tightening the screw thread (72) to the end of the threaded surface (32) to a position, in which the bracket attachment (60) and the current transferring body (30) are in an optimal position from each other. To maintenance of this optimal position is ensured by the conically narrowed (68) part expanding the cuts slightly against the flexibility of the end with several cuts (70).

Figure 2:
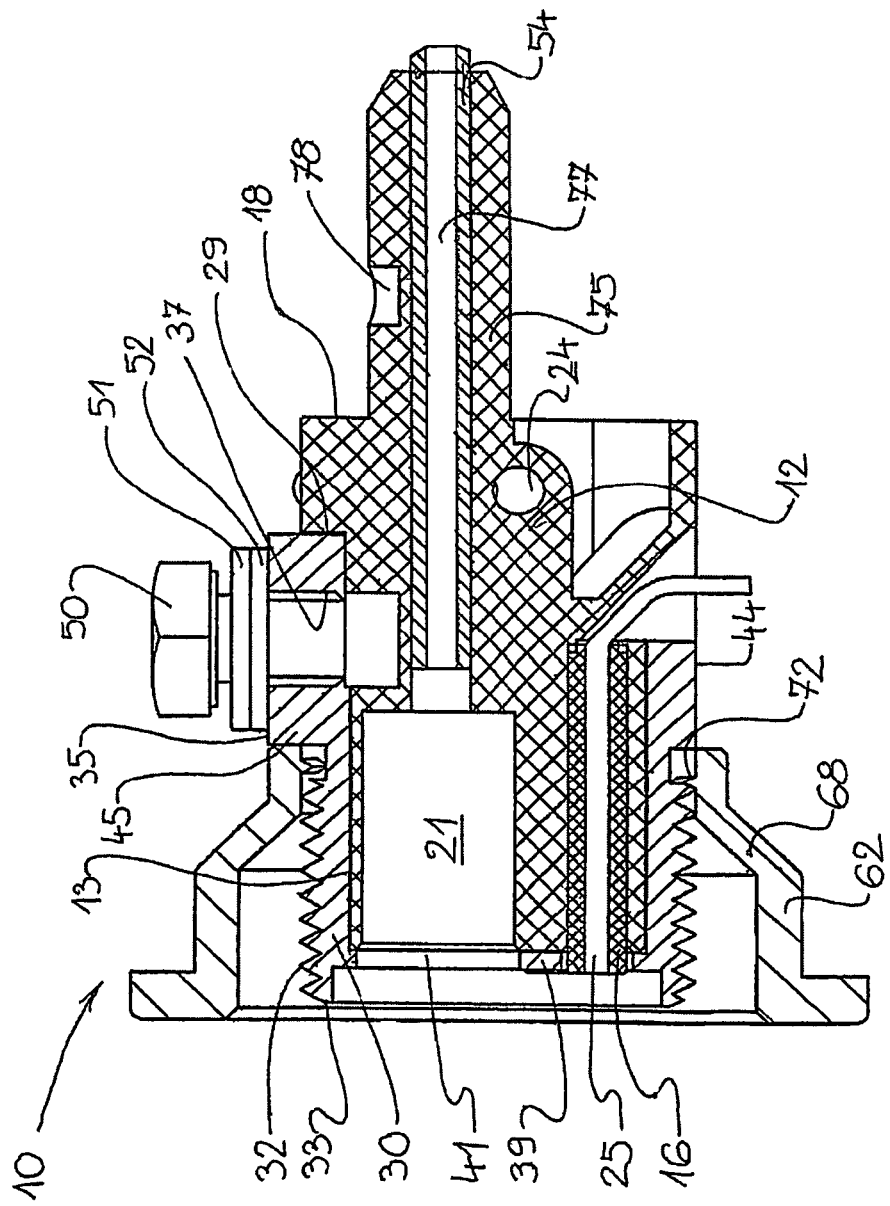
FIG. 2 is a cross-section view on an A-A axis.

FIG. 2 shows a cross-sectional view on an axis A-A of the connector discussed above as FIG. 1. In this diagram the connector body (12) can be clearly seen, on the cylindrical front (13) part of which the current transferring (30) body fits. The rear surface (18) of the stop of the connector (10) can be well observed on the connector body (12), as well as the stem (75) projecting backwards from it, with the bore (77) which is drilled into the centre level of the stem, into which the inserted pipe (54) is fixed.

The welding wire is led through the inserted (54) pipe and is connected to the connector (10) and to the welding wire support hole (21) for the wire guide contact. The inserted pipe is made of a wear-resistant material, usually from metal, and its bore size matches the diameter of welding wire used. The inserted pipe (54) is fixed in a way so that it can be replaced either when it wears out, or when it has to be replaced because another welding wire is used with different diameter.

The stem (75) of the connector (10), if it is assembled with a wire puller, is pulled into the bore which is on the wire guiding element situated on the output side of the wire puller, and is pushed up to a point when it is completely stopped by the rear surface (18). When the connector (10) is pushed into this position it can be fixed with a screw, through the correctly positioned bore on the wire puller, and screwed by fixing into the hole (78) (usually into a blind drilling) on the stem (78) the connector (10) is then positioned and fixed in the wire puller.

The section of the (24) hole leading to the (23) other hole for the gas pipe stub we discussed on FIG. 1 can also be seen on the (12) connector body, as well as the bore (25) into which one of the electric contacts is fitted, and the insulating (16) sleeve inside the bore (25). The end of the (16) sleeve projects out from the front surface of the connecting (12) body. As it is indicated on the diagram, the electric contacts are connected to wires, and are led out on the side of the connector (10).

The bottom plate (39) of the current transferring body (30) fits on the front surface of the cylindrical front part of the connector body (12). It can be seen clearly on the diagram that the connecting hole (41) on the bottom plate (39) leaves the hole (21) for the wire guide contact uncovered, and also, the connecting (43) hole (not listed here with a separate number) leaves the bore (25) uncovered, and from which the insulating sleeve (16) projects.

The threaded surface (32) situated on the outer side of the current (30) transferring body also can also be clearly seen on the diagram, so can be the ring shaped front contact surface (33), and the thicker (45) projection, on which is located the side (35) contact surface and through which the bore (37) is drilled, and also the side (44) uncovered surface. By comparison with the known solutions, in this example the surface of the current transferring (30) body is increased by the surface of the bottom plate, and by the side (44) uncovered surface opening into open air, which improves the cooling ability of the connector (10).

The diagram shows clearly how the current transferring (30) body is fixed on the connector body (12), by fitting the current wire into the hole (27) through the bore (37) with a screw (50) with the appropriate insert spring (52) and washer (52).

The sleeve part (62) of the bracket attachment can also be well seen on the diagram, as well as its extension, the conically narrowed (68) part, which has inside, on its end, a threaded surface (32) to which a screw thread (72) is connected and is screwed completely on the current transferring body (30) when it is properly used, so that the screw thread (72) connects with the inside most thread of threaded surface (32).

Figure 3:
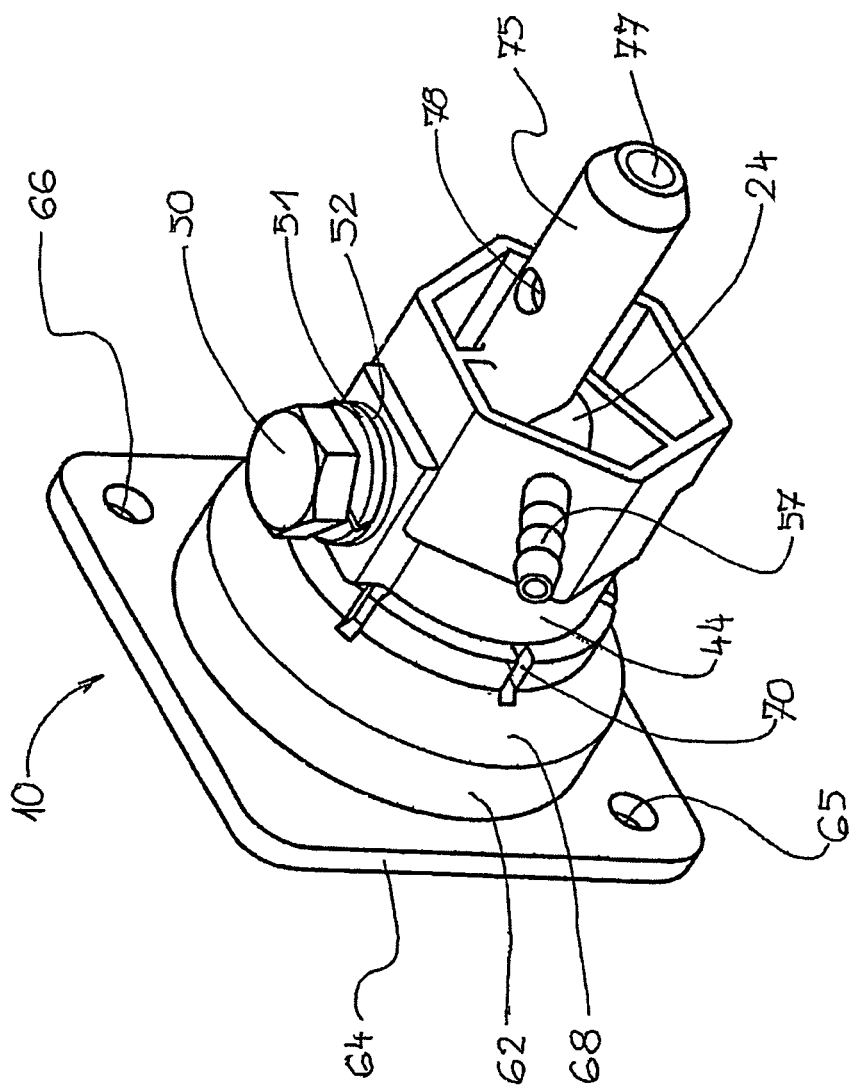
FIG. 3 is a rear perspective view of the connector.

FIG. 3 is a rear perspective view of the connector. The bracket attachment (60) (here without being listed with a separate number), and its sleeve part (62) and the flange projecting from it, and the two bores on it (65, 66) for fixing, as well as the backwards, conically narrowed projection (68) with several cuts on the end (70) of the bracket attachment can be well seen on the diagram. It can also be seen that the side contact surface (44) is uncovered and has free access to air, which improves the cooling specifications of the connector. The hole (24) in the connector body (12) with the lead-in pipe stub fixed into its outer end, the screw (50) with washers (51,52) that fixes the current transferring cable to the current transferring body, the stem (75) with its (78) positioning indent that makes the assembly of the connector (10) easier with a wire-puller, and the bore (77) for the inserted pipe are also visible.

The invention claimed is:
1. A connector (10) for connecting a welding torch where the connector comprises a connector body (12) with a cylindrical front part (13) made of electrically insulating material, a nest (21) for a wire guide conduit end, a nest (23) for a gas supply conduit end situated on a front surface (15) of the connector body (12), and one or more electric contacts let into hole(s) (25) situated on the front surface (15), and a liner (54) for a wire guide, leading into a bottom of the nest (21) for the wire guide conduit end, a passage (24) which leads into the nest (23) for the gas supply conduit end and a gas lead-in pipe stub (57) fixed into an outer end of the passage (24), further and a cylindrical current transferring body (30) fitted on the cylindrical front part (13) of the connector body (12), made of electrically conductive material, a threaded surface (32) and a side contact surface (35) besides the threaded surface (32) on a side surface of the cylindrical current transferring body (30), and a frontal contact surface on the cylindrical current transferring body (30), a threaded bore on the side contact surface (35) of the cylindrical current transferring body (30) for a screwed joint and a joining element (50) to join into the threaded bore, in addition an attachment bracket (60), made of electrically insulating plastic, the attachment bracket (60) having a sleeve part (62), which encircles space apart the threaded surface (32) of the cylindrical current transferring body (30), the sleeve part (62) having a flange (64) protruding from its front part for fixing, the flange (64) being provided with one or more holes (65) in it, where the attachment bracket (60), the cylindrical current transferring body (30) and the connector body (12) are in a fixed position relative to each other,
   wherein the connector body (12) has a rear limiting surface (18) out of which a stem (75) projects, the stem (75) having a bore hole (77) in its centre line into which the liner (54) for wire guide (54) is fixed, the cylindrical current transferring body (30) having a pot-shape, having a bottom (39) in which there are openings (41, 42, 43) opening onto the nest (21) for the wire guide conduit end, onto the nest (23) for the gas supply conduit end and onto the electric contact (s), further the side contact surface (35) projects at the threaded surface (32) and the threaded bore (37) on the side contact surface (35) is drilled through, and there is a positioning hole (27) in an extension of the threaded bore (37) on a side of the connector body (12), further the attachment bracket (60) has a conically narrowed part (68) projecting rearwards from the sleeve part (62), and on an inner surface near an end of the narrowed part (68) there is at least one screw thread (72) which joins to the side threaded surface (32) of the cylindrical current transferring body (30), and there is at least one cut (70) in the end of the narrowed part (68) provided with the screw thread (72), and there is an uncovered side surface (44) besides the threaded surface (32) on the cylindrical current transferring body (30).

2. The connector (10) according to claim 1 wherein there is an insulating sleeve (16), which encircles the electric contact let into hole(s) (25) situated on the front surface (15) of the connector body (12), and an end of the insulating sleeve (16) projects into the opening (43) which is situated in the bottom (39) of the cylindrical current transferring body (30).

3. The connector (10) according to claim 1 or 2, wherein a part of the cylindrical current transferring body (30) carrying the threaded bore (37) drilled through in a side contact surface (35) is formed as a thicker projection (45).

4. The connector (10) according to claim 3 wherein there is a positioning indent (28) on the side contact surface of the connector body (12) into which the thicker projection (45) fits.

5. The connector (10) according to claim 1 or 2, wherein a front shoulder (29) is situated on the side contact surface of the connector body (12) for positioning the cylindrical current transferring body (30).

6. The connector (10) according to claim 1 or 2, wherein an indent (78) is situated on a side of the stem (75).

7. The connector (10) according to claim 1 or 2, wherein the wire(s) connecting to the electric contact (s) is/are led through the side contact surface of the connector body (12).

8. The connector (10) according to claim 1 or 2, wherein the lead-in gas pipe stub (57) extends from the side contact surface of the connector body (12).

* * * * *